US011797127B1

(12) United States Patent
Higgins et al.

(10) Patent No.: US 11,797,127 B1
(45) Date of Patent: Oct. 24, 2023

(54) HYBRID TRACKING WITH AUTO-CORRECTION

(71) Applicant: ALKEN Inc., Colchester, VT (US)

(72) Inventors: Robert F. Higgins, South Burlington, VT (US); Henry E. Himberg, South Burlington, VT (US); Allan G. Rodgers, Jr., Waterbury, VT (US)

(73) Assignee: ALKEN Inc., Colchester, VT (US)

(*) Notice: Subject to any disclaimer, the term of this patent is extended or adjusted under 35 U.S.C. 154(b) by 0 days.

(21) Appl. No.: 17/987,426

(22) Filed: Nov. 15, 2022

Related U.S. Application Data

(60) Provisional application No. 63/279,806, filed on Nov. 16, 2021.

(51) Int. Cl.
G06F 3/041 (2006.01)
G06F 3/01 (2006.01)

(52) U.S. Cl.
CPC ............ *G06F 3/0418* (2013.01); *G06F 3/011* (2013.01)

(58) Field of Classification Search
CPC ............................... G06F 3/011; G06F 3/0418
See application file for complete search history.

(56) References Cited

U.S. PATENT DOCUMENTS

| 6,172,499 B1 | 1/2001 | Ashe |
| 7,640,106 B1 | 12/2009 | Stokar et al. |
| 8,723,509 B2 | 5/2014 | Patterson, III et al. |
| 10,180,734 B2 * | 1/2019 | Miller ................. G06F 3/04815 |
| 10,261,162 B2 * | 4/2019 | Bucknor ................. G01S 1/7038 |
| 10,402,649 B2 * | 9/2019 | Rabinovich ............ G06V 10/82 |
| 10,495,718 B2 * | 12/2019 | Bucknor .................. G06F 1/163 |
| 10,534,043 B2 * | 1/2020 | Woods .................. G06F 3/0346 |
| 10,678,324 B2 * | 6/2020 | Miller ...................... G06F 3/011 |
| 10,733,447 B2 * | 8/2020 | Rabinovich ............ G06V 10/82 |
| 10,802,586 B1 * | 10/2020 | Zhao ......................... G01D 5/14 |
| 10,908,680 B1 * | 2/2021 | Woods ................. G02B 27/017 |
| 10,948,721 B2 * | 3/2021 | Bucknor ................... G01S 1/70 |
| 11,016,305 B2 * | 5/2021 | Wan ....................... G06T 19/006 |
| 11,120,266 B2 * | 9/2021 | Rabinovich ............ G06N 3/044 |
| 11,150,310 B2 * | 10/2021 | Woods .................. G01R 35/00 |
| 11,157,090 B2 * | 10/2021 | Chan .................. G02B 27/0179 |
| 11,347,054 B2 * | 5/2022 | Woods .................. G06T 19/006 |
| 11,353,709 B2 * | 6/2022 | Wan .......................... G01S 5/10 |
| 11,460,698 B2 * | 10/2022 | Bucknor .............. H01H 9/0235 |
| 11,531,072 B2 * | 12/2022 | Woods ................... G01R 35/00 |
| 2011/0251815 A1 | 10/2011 | Bar-Tal et al. |
| 2017/0205903 A1 * | 7/2017 | Miller ..................... G06T 7/174 |
| 2017/0307891 A1 * | 10/2017 | Bucknor ............... G01S 1/7038 |
| 2018/0053056 A1 * | 2/2018 | Rabinovich ........... G06N 3/044 |

(Continued)

FOREIGN PATENT DOCUMENTS

WO 2018102009 A1 6/2018

*Primary Examiner* — Michael Pervan
(74) *Attorney, Agent, or Firm* — Lerner David LLP

(57) ABSTRACT

An apparatus and method for implementing a technique for performing calibration of an electromagnetic tracking apparatus on-the-fly while operating the apparatus. The apparatus and method uses a non-magnetic tracking device to determine position and orientation of a tracked object that is not subject to magnetic distortion or interference, and store calibration data for future measurements by the electromagnetic tracking apparatus based on the measurements made by the non-magnetic tracking device.

23 Claims, 4 Drawing Sheets

(56) References Cited

U.S. PATENT DOCUMENTS

| | | | |
|---|---|---|---|
| 2018/0088185 A1* | 3/2018 | Woods | G06F 3/0304 |
| 2018/0120109 A1 | 5/2018 | Fite-Georgel et al. | |
| 2018/0239144 A1* | 8/2018 | Woods | A63F 13/213 |
| 2018/0351661 A1 | 12/2018 | Briggs et al. | |
| 2019/0113966 A1 | 4/2019 | Connellan et al. | |
| 2019/0155374 A1* | 5/2019 | Miller | G06T 19/006 |
| 2019/0195979 A1* | 6/2019 | Bucknor | G01S 5/0247 |
| 2019/0340435 A1* | 11/2019 | Rabinovich | G06F 3/0346 |
| 2019/0353745 A1 | 11/2019 | Zur et al. | |
| 2020/0064431 A1* | 2/2020 | Bucknor | G06F 3/014 |
| 2020/0096575 A1* | 3/2020 | Woods | G06F 3/0346 |
| 2020/0133405 A1* | 4/2020 | Chan | G01R 33/0082 |
| 2020/0326544 A1* | 10/2020 | Wan | G06T 19/006 |
| 2020/0334461 A1* | 10/2020 | Rabinovich | G06V 20/20 |
| 2021/0141448 A1* | 5/2021 | Woods | G01B 7/30 |
| 2021/0165217 A1* | 6/2021 | Bucknor | G06F 3/012 |
| 2021/0239993 A1* | 8/2021 | Wan | G01B 7/004 |
| 2022/0034978 A1* | 2/2022 | Woods | G01R 35/00 |
| 2022/0035461 A1* | 2/2022 | Chan | G01R 33/02 |
| 2022/0067378 A1* | 3/2022 | Rabinovich | G06V 40/166 |
| 2022/0260839 A1* | 8/2022 | Wan | G06F 18/25 |
| 2022/0365351 A1* | 11/2022 | Woods | A63F 13/5255 |
| 2022/0404622 A1* | 12/2022 | Bucknor | G01S 1/68 |
| 2023/0100979 A1* | 3/2023 | Wan | G02B 27/0179 345/8 |

\* cited by examiner

| Coordinate Position and Orientation | Correction Factor(s) |
|---|---|
| < 0.35, 2.05, -1.10 ><br>< 30, 270, 45 > | < 0.2, -0.05, 0 ><br>< -10, 0, 15 > |
| < 0.2, 2.0, -0.85 ><br>< 25, 315, 80 > | < -0.05, 0.1, -0.15 ><br>< 20, -15, 5 > |
| < 0.1, 1.8, -0.5 ><br>< 0, 300, 55 > | < 0.25, 0.25, -0.1 ><br>< 30, 0, 0 > |
| < -0.15, 2.05, -0.25 ><br>< 0, 320, 45 > | < -0.05, 0.05, 0.15 ><br>< -5, -5, -15 > |
| ••• | ••• |

HYBRID TRACKING WITH AUTO-CORRECTION

CROSS-REFERENCE TO RELATED APPLICATIONS

The present application claims the benefit of the filing date of U.S. Provisional Patent Application No. 63/279,806 filed Nov. 16, 2021, the disclosure of which is hereby incorporated herein by reference.

TECHNICAL FIELD

The present disclosure generally relates to electromagnetic tracking systems.

BACKGROUND

Electromagnetic tracking systems use electromagnetic field emitters and sensors to determine position and/or orientation (PnO) of a tracked object. In hybrid tracking systems, other technologies such as gyroscopes, accelerometers, magnetometers, barometers and others, can be combined with the electromagnetic emitters and sensors in order to improve the PnO determinations. The electromagnetic and other sensors communicate signals to a processing device included in the system electronics.

The electromagnetic signals communicated between the emitters and sensors may be subject to errors caused by field distortion. This distortion can be corrected and the errors reduced by characterizing the operating volume of the tracking system using an alternative measurement tool that does not rely on the magnetic field. Typically, characterization is conducted during an initial calibration phase before operation of the tracking system. The calibration phase relies on mechanical registration, in which a sensor is placed in a known and often fixed location in order to collect calibration data for many points of the operating volume. The calibration data may subsequently, during operation of the tracking device, be used to compensate for the errors caused by field distortion.

Characterizing the operating volume requires moving the electromagnetic emitter or sensor throughout the operating volume to collect calibration data for each and every location within the volume. Additionally, characterization techniques using mechanical registration often require careful physical alignment of a sensor, which can add further complexity and time to the calibration process. It would be desirable for the tracking system to be used immediately upon startup, and without requiring rigorous and time-consuming calibration steps.

SUMMARY

The present disclosure provides systems and methods for a conducting calibration for an electromagnetic tracking system while the system is already in use. This means that a user can begin using the electromagnetic tracking system immediately upon startup and without having to first move an emitter or sensor of the system throughout the operating volume. When the user enters a new coordinate of the operating volume that has not been previously calibrated, the system may compare a first PnO of the tracked object determined by the electromagnetic signals to a second PnO of the tracked object determined by a non-magnetic tracking system that is not subject to magnetic field distortion, calibrate the first PnO based on the second PnO, and store the calibration data in a lookup table in association with the corresponding coordinate. Then, if the user ever revisits the same coordinate of the operating volume, the system may obtain a new first PnO of the tracked object and correct the first PnO based on the stored calibration data.

BRIEF DESCRIPTION OF THE DRAWINGS

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the drawings, specific terminology may be used for the sake of clarity. However, the aspects of the present disclosure are not intended to be limited to the specific terms used.

FIG. 2 is a diagram illustrating an example lookup table in accordance with an aspect of the disclosure.

DETAILED DESCRIPTION

Figure 1:
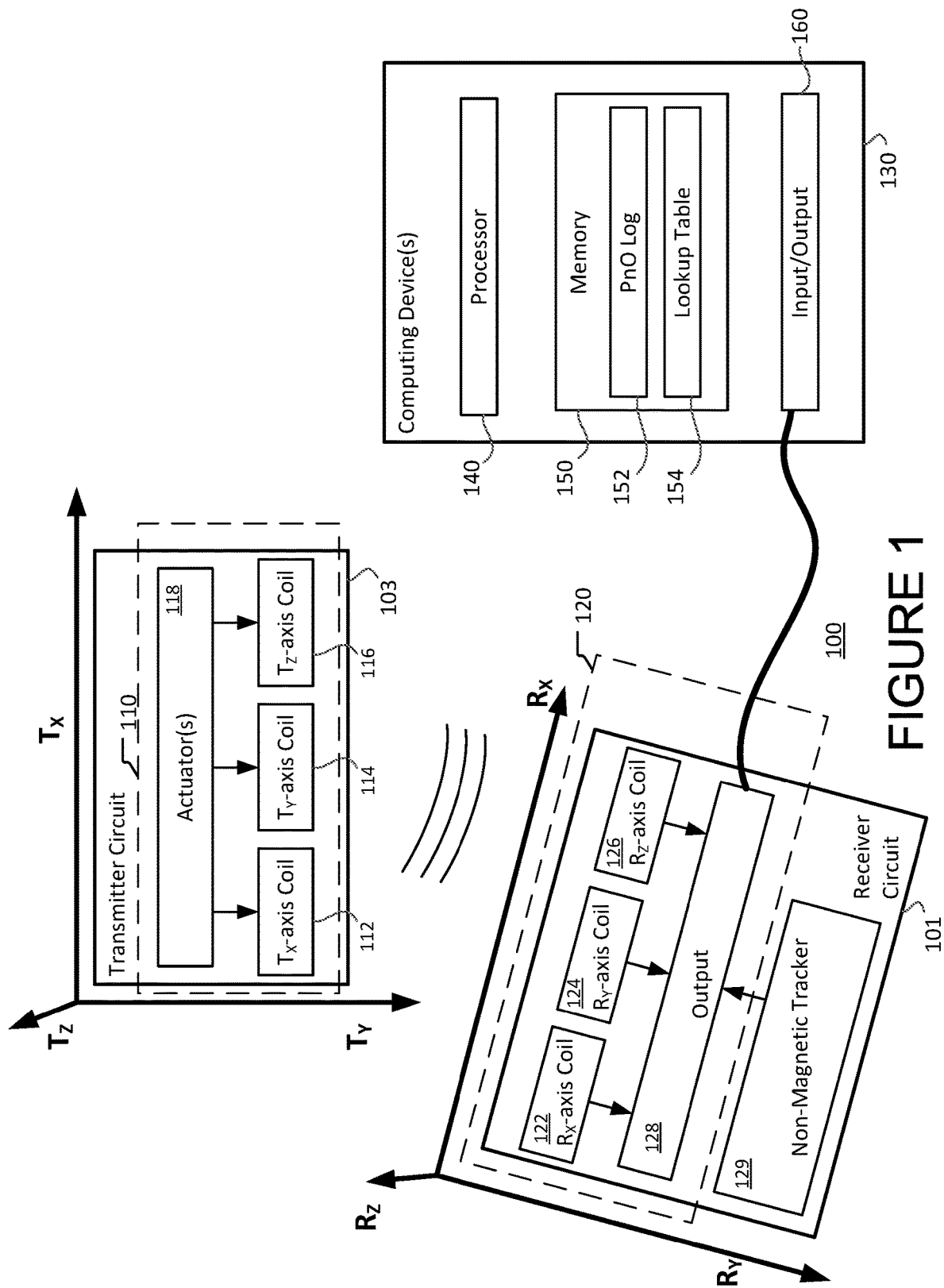
FIG. 1 is a block diagram of an electromagnetic tracking system in accordance with an aspect of the disclosure.

FIG. 1 is a block diagram illustrating a system 100 for tracking the position and orientation (PnO) of a first object 101 that is freely movable relative to a second object 103. The system 100 includes each of an electromagnetic tracking system and a non-magnetic tracking system. Each system may be independently capable of tracking a position and/or orientation (PnO) of the first object 101. The PnO of the first object may be characterized in terms of a frame of reference defined by the second object 103. Thus, the PnO of the first object 101 is tracked relative to the second object 103.

The electromagnetic tracking system includes a transmitter circuit 110 for generating an electromagnetic field, and a receiver circuit 120 for sensing the generated electromagnetic field and generating electrical signals based on the sensed electromagnetic field.

In the example of FIG. 1, the transmitter circuit 110 includes a transmitter coil array having a plurality of transmitter coils 112, 114, 116 physically mounted to a second object 103. The transmitter coils are aligned along axes of the transmitter, respectively. In FIG. 1, these axes are denoted $T_X$, $T_Y$ and $T_Z$. The $T_X$, $T_Y$ and $T_Z$ axes may be orthogonal to one another, or they may be different from one another without being orthogonal. Generally, the axes do not all extend within a common plane so that the axes form a three-dimensional frame of reference or coordinate system.

The transmitter circuit 110 may further include an actuating circuit 118 configured to actuate the transmitter coils at different times or different frequencies. The actuating circuit 118 may include one or more frequency generators for generating one or more alternating signals. A different frequency signal may be provided to a respective driver for driving each coil, respectively. Alternatively, the same alternating signal may be input to a multiplexer which is timed by a clock included in the transmitter, and outputs of the multiplexer may be provided to the respective drivers at different times. The drivers may further include additional components for driving the coils, such as one or more amplifier circuits. The alternating signal applied to each coil causes the coil to produce an electromagnetic field. Because the driving signals differ from one another in frequency, timing, or both, the fields produced by the various coils also differ from one another. The electromagnetic field produced by the coils may be symmetrical. For instance, the electromagnetic field may be a dipole field having axis of symmetry and two symmetrical sides or hemispheres on either side of the axis of symmetry. Thus, every location within the tracking volume of the system can be characterized as being in one of the two hemispheres of the electromagnetic field.

In the example of FIG. 1, the receiver circuit 120 includes a receiver coil array having a plurality of receiver coils 122, 124, 126 mounted to a first object 101 aligned along axes of the receiver circuit, respectively. In FIG. 1, these axes are denoted $R_X$, $R_Y$ and $R_Z$. The $R_X$, $R_Y$ and $R_Z$ axes are fixed relative to the first object 101. As with the transmitter axes, the receiver axes may be orthogonal to one another, or may be different from one another without being orthogonal, but generally form a three-dimensional coordinate system (e.g., do not all extend within a common plane).

Since the receiver coils can be oriented independent of the transmitter coils, it should be understood that the $R_X$, $R_Y$ and $R_Z$ axes of the receiver coil typically are not aligned with the $T_X$, $T_Y$, $T_Z$ axes of the transmitter circuit. Thus, the PnO determined by the electromagnetic tracking system may be characterized in terms of a position and an orientation of the axes of the receiver circuit relative to the axes of the transmitter coils. In this regard, the movement in position or orientation of one or more transmitter coils relative to the receiver coils, or one or more receiver coils relative to the transmitter coils, will influence the PnO solution derived by the system. As such, the transmitter coils and receiver coils are referred to herein as "active elements," whereby the transmitter coils 112, 114 and 116 form one set of active elements of the magnetic locating system, and the receiver coils 122, 124 and 126 form another set of active elements of the magnetic locating system.

The electromagnetic fields generated by the transmitter circuit 110 cause alternating electric current to be generated in the windings of the receiver coils 122, 124, 126. The alternating electric current in each receiver coil typically includes multiple components. Each component is caused by the field generated by one of the transmitter coils. Because the fields generated by the transmitter coils differ from one another in timing, frequency or both, the components of the current in each receiver coil also differ from one another. The system includes conventional elements (not shown) for separating the components of the current in each. The components of the current in coil 122 include a component referred to as $T_X R_X$, representing the current in $R_X$ receiver coil 122 resulting from the field generated by $T_X$ transmitter coil 112; another component $T_Y R_X$ representing the current in $R_X$ receiver coil 122 resulting from the field generated by $T_Y$ transmitter coil 114, and a further component $T_Z R_X$ representing the current in $R_X$ receiver coil 122 resulting from the field generated by $T_Z$ transmitter coil 116. Similarly, the components of the current in $R_Y$ receiver coil 124 include components $T_X R_Y$, $T_Y R_Y$ and $T_Z R_Y$, and the components of the current in $R_Z$ receiver coil 126 include components $T_X R_Z$, $T_Y R_Z$ and $T_Z R_Z$.

In the case of a time-division based transmission, the timing of the electric currents may indicate which of the transmitter coils 112, 114, 116 generated the electromagnetic fields that resulted in the electric current. The system may include a conventional separation circuit synchronized to the timing of the transmitter circuit to separate the components according to the time they are received. In the case of a frequency-division based transmission, the separation circuit may include analog or digital frequency-selective filters. The separation circuit may be provided as part of the receiver circuit 120, or may be included in one or more computing devices 130 discussed herein.

The non-magnetic tracking system includes one or more active elements, at least one of which is depicted in FIG. 1 as a tracking device in the form of block 129. The non-magnetic tracking device 129 may be a conventional inertial locating device including a set of active elements such as linear acceleration sensors and gyroscopic sensors (not shown). In the example of FIG. 1, the device 129 is put in a fixed position relative to the active elements of the receiver circuit 120 of the electromagnetic tracking system. Preferably, the active elements of the non-magnetic tracking device 129 are co-located with the receiver coils, so that a movement of the receiver circuit 120 corresponds to a movement of the non-magnetic tracking device 129. For instance, the device 129 may be mounted on the first object 101 along with the receiver coils 122, 124, 126. In other examples, the non-magnetic tracking system may include one or more other devices having other active elements for monitoring movement of the second object 103, which may or may not be a moving frame of reference (as, for example, if the second object 103 is mounted in a vehicle that may or may not be in motion). Desirably, the non-magnetic tracking system estimates a motion of the first object 101 relative to the second object 103.

Motion data derived from the non-magnetic tracking device 129 may be indicative of translation, rotation, or a combination thereof. For instance, the non-magnetic tracking device 129 may include an inertial measurement unit (IMU) having accelerometers and gyroscopes for tracking changes in position and orientation of the receiver circuit and, by extension, tracked object. Positional acceleration data and rotational velocity data from the IMU may be processed to determine translation and rotation of the tracked object.

In further embodiments, the non-magnetic tracking system may include any one or combination of gyroscopes, accelerometers, barometers, optical sensors and transmitters, acoustic sensors and transmitters, radio frequency (RF) sensors and transmitters, global positioning system (GPS) receivers, radar chips, magnetometers, and other non-magnetic technologies and devices for tracking position and/or orientation of one object relative to another object. For purposes of the present disclosure, the non-magnetic tracking device may additionally or alternatively include magnet-based sensors that do not rely on an electromagnetic transmitter circuit for its sensor readings and that are not sensitive to local electromagnetic distortions within the tracking environment, such as a magnetometer for sensing a magnetic field polarity (such as a magnetic field of the Earth). Each of the active elements of the non-magnetic tracking device may be capable of tracking a motion of the tracked object, in terms of position, orientation, or a combination thereof.

Motion of the tracked object may be determined by the non-magnetic tracking system independent of the determinations made by the electromagnetic tracking system. More specifically, the motion of the tracked object may be determined by the non-magnetic tracking system independent of the electromagnetic field generated by the electromagnetic tracking system. This means that the non-magnetic tracking system operates correctly without requiring knowledge of which hemisphere of the electromagnetic field the tracked object is located in.

Each of the electromagnetic tracking system and the non-magnetic tracking system may be connected to one or more computing devices 130 included in the system electronics in order to transmit and receive data with the computing devices. For example, in FIG. 1, the receiver circuit 120 includes an output circuit 128 for receiving generated electric currents and providing the currents as electrical signals to one or more computing devices 130. The output to the computing devices 130 may be an analog or digital signal, depending on the available hardware and software included in each of the output circuit 128 and the computing devices 130.

The non-magnetic tracking device 129 is also connected to the one or more computing devices 130 included in the system electronics in order to transmit and receive data with the computing devices 130. The one or more computing devices 130 are configured to receive and process the electrical signals generated by active elements included in or mounted to the first object 101, which includes the receiver circuit 120 and non-magnetic tracking device 129. In the example of FIG. 1, the connection between the magnetic and non-magnetic active elements and the one or more computing devices 130 is shown as a wired connection using a cable, such as a USB Type-C cable. Other cables typically used in electromagnetic tracking systems, or wireless connections, including short range communication protocols such as near-field communication (NFC), WiFi, Bluetooth, Bluetooth LE, may be used. Additionally or alternatively, the transmitter circuit and the receiver circuit may be connected to one another in a wired or wireless manner in order to provide information there between, such as providing phase information from the transmitter to the receiver to avoid phase ambiguity of the electromagnetic field generated by the transmitter.

The magnetic and non-magnetic tracking systems may be configured to ensure that data collected at the same time by the respective systems is compared to one another at the one or more computing devices 130. This may involve wiring the magnetic and non-magnetic systems together to synchronize data collection and transmission, providing time signatures with the collected data, or some combination thereof.

The one or more computing devices 130 of the system electronics may include a processor 140, memory 150, and other components typically present in general-purpose computers. The computing devices 130 may further include one or more input/output connections 160 for sending and receiving data from the transmitter circuit, receiver circuit, non-magnetic tracker, or any combination thereof.

The processor 140 may be a well-known processor or other lesser-known types of processors. Alternatively, the processor 140 can be a dedicated controller such as an ASIC. The memory 150 can store information accessible by the processor 140, including data that can be retrieved, manipulated or stored by the processor 140, in accordance with instructions stored in the memory. The memory 150 may be a type of non-transitory computer readable medium capable of storing information accessible by the processor 140, such as a hard-drive, solid state drive, tape drive, optical storage, memory card, ROM, RAM, DVD, CD-ROM, write-capable, and read-only memories.

Although the system described herein is not limited by a particular data structure, the data may be stored in computer registers, in a data store as a structure having a plurality of different fields and records, or documents, or buffers. The data may also be formatted in a computer-readable format such as, but not limited to, binary values, ASCII or Unicode. Moreover, the data can include information sufficient to identify relevant information, such as numbers, descriptive text, proprietary codes, pointers, references to data stored in other memories, including other network locations, or information that is used by a function to calculate relevant data. The instructions may be a set of instructions executed directly, such as machine code, or indirectly, such as scripts, by the processor 140. In this regard, the terms "instructions," "steps," "programs" and "routines" can be used interchangeably herein. The instructions can be stored in object code format for direct processing by the processor 140, or other types of computer language including scripts or collections of independent source code modules that are interpreted on demand or compiled in advance.

Although FIG. 1 functionally illustrates the processor 140 and memory 150 as being within the same computing device block 130, the processor 140 and memory 150 may actually include multiple processors and memories that may or may not be stored within the same physical housing. For example, some of the data 170 and instructions 180 may be stored on a removable CD-ROM and others within a read-only computer chip. Some or all of the instructions and data can be stored in a location physically remote from, yet still accessible by, the processor 140. Similarly, the processor 140 can actually include a collection of processors, which may or may not operate in parallel.

Additionally, the computing device 130 in FIG. 1 is shown as a single block, although it should be appreciated that computing device components may be provided separately from one another or in separate components. For example, the processor 140 may represent multiple processors included in different computing devices and communicatively connected to one another by one or more wired or wireless connections. Additionally or alternatively, data or instructions of the memory may be stored in different computing devices and communicatively connected by one or more wired or wireless connections.

For example, the computing device may include memory 150 storing a database, may be connected to a remote memory storing a database, or both, for the purpose of storing information derived by the processor 140 of the computing device 130. The database may be useful for logging a PnO 152 of the first object 101 over a duration of time, whereby the logged data can be accessed and evaluated at a later time. The database may also be useful for storing a lookup table 154 containing calibration information for correcting errors in PnO measurements derived from electromagnetic tracking system caused by electromagnetic field distortion.

FIG. 2 illustrates an example lookup table 200. Prior to operation of the system, the lookup table 200 may be empty, and the entries shown in FIG. 2 may be added to the lookup table 200 over the course of operation of the system. In the example of FIG. 2, each entry added to the lookup table 200 is represented by two columns, a first column 210 indicating a particular coordinate location within an operating volume of the electromagnetic tracking system, and a second column 220 indicating a correction factor, such as one or more adjustment vectors to be applied to the coordinate location of the first column 210. In operation, adjustment of a PnO value derived from the electromagnetic tracking system can be adjusted according to the corresponding adjustment vectors in order to compensate for known distortion of the derived PnO value. The distortion may be known from one or more factors, such as analysis of a quality factor of the electromagnetic signals communicated between the emitters and sensors of the electromagnetic tracking system. Some examples of quality factor determination for an electromagnetic tracking system are described in greater detail in commonly owned U.S. patent application Ser. No. 16/773,482, the disclosure of which is incorporated herein in its entirety by reference.

In the example of FIG. 2, each of the coordinate locations included in the first column 210 is a six-dimensional coordinate, including a three-dimensional position and a three-dimensional orientation, corresponding to a particular position and orientation of the tracked object within the operating volume of the electromagnetic tracking system. Similarly, each of the adjustment vectors included in second first column 220 is a three-dimensional vector indicating a change in position or orientation within the operating volume. For example, pairs of <X,Y,Z> and <α,β,γ> coordinates are shown for the sake of example. However, it should be recognized that other three-dimensional coordinate systems may be used to represent positions and orientations and adjustment vectors, and even that the same or different coordinate systems may be used for the first and second columns of the lookup table. For instance, the pairs of three-dimensional coordinates may be combined into a six dimensional coordinate.

Taking the first row of the example lookup table 200 for example, the first row includes an entry for a coordinate position <0.35,2.05,−1.10> and coordinate orientation <30, 270, 45> which may be 0.35 meters from a fixed point of origin of the operating volume in a positive direction along an X-axis, 2.05 meters from origin in a positive direction along a Y-axis, 1.10 meters from origin in a negative direction along a Z-axis, having a roll of 30 degrees, a pitch of 270 degrees and a yaw of 45 degrees. In this example, when the tracked object is indicated as being located at this coordinate position and coordinate orientation, it may be known from previous calibration measurements that the tracked object is actually at a different position and orientation but that some distortion is interfering with an electromagnetic field between the emitter and sensor of the electromagnetic tracking system. It may further be known from the previous calibration measurements that the correct coordinate position of the tracked object is <0.55,2.00,−1.10> and the correct coordinate orientation of the tracked object is <20,270,60> based on measurements taken using a non-magnetic tracking system that is not affected by the distorting element. In the example of FIG. 2, this correct coordinate position and orientation of the tracked object is represented as an adjustment of <0.20,−0.05,0> to the coordinate position and an adjustment of <−10,0,15>, or 0.2 meters in the positive direction along the X-axis, −0.05 meters in the negative direction along the Y-axis, no movement along the Z-axis, a roll adjustment of −10 degrees, no pitch adjustment, and a yaw adjustment of 15 degrees. In other examples, the adjustment may be stored differently, such as by storing the correct coordinate position and orientation.

Figure 3:
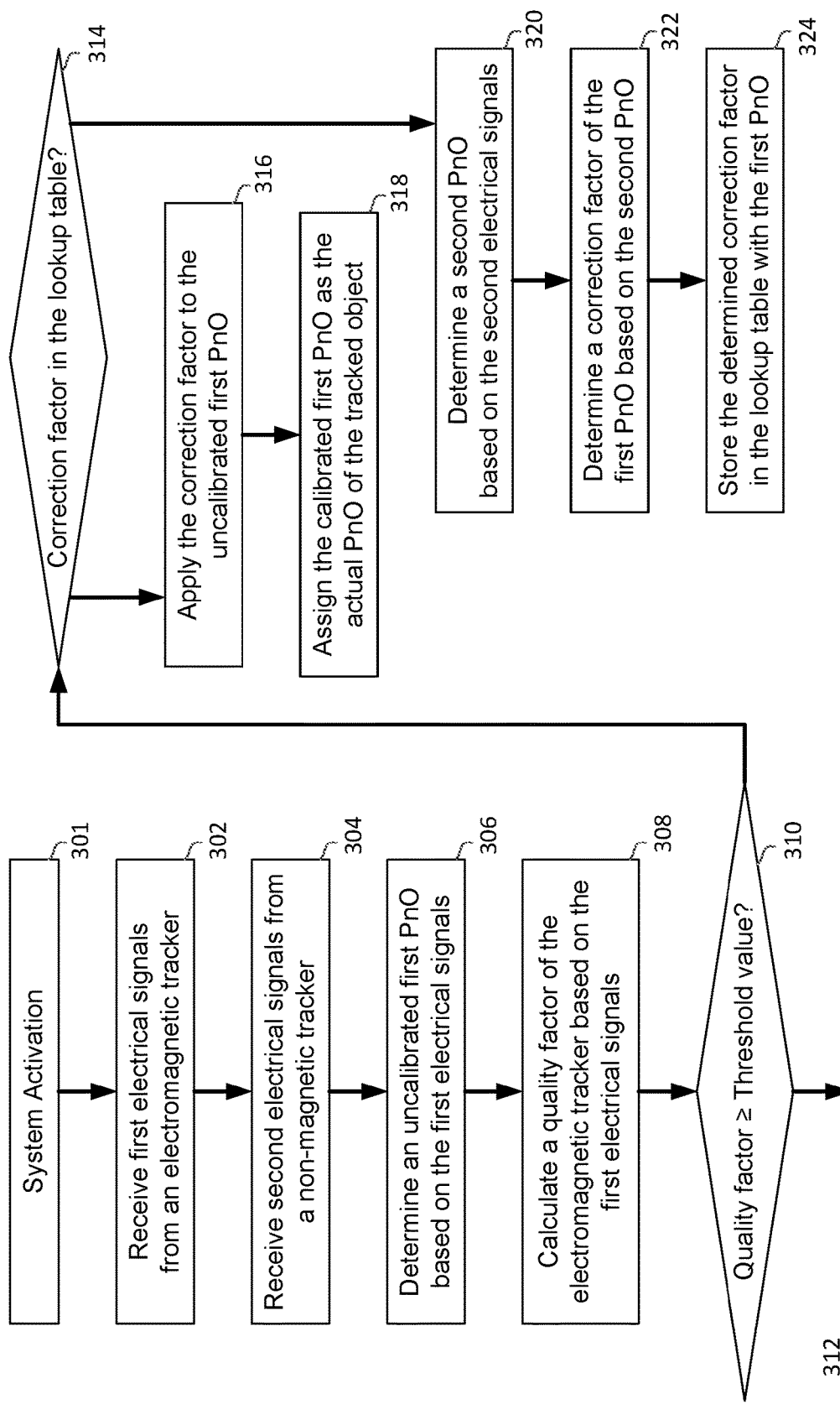
FIG. 3 is a flow diagram of an example routine in accordance with an aspect of the disclosure.

FIG. 3 is a flow diagram showing an example routine 300 for determining a position and/or orientation of a receiver circuit in an electromagnetic tracking system, such as the system 100 shown in FIG. 1. At least some of the operations in the routine 300 may be carried out by the computing device(s) of the system electronics. It should be understood that in other examples, steps may be added, subtracted, replaced or reordered in the routine 300.

At block 301, and prior to the routine, the system may be activated. Activation of the system may involve the transmitter of the electromagnetic tracking system beginning to emit an electromagnetic field, and the emitted field being sensed and generating electrical signals at the receiver.

At block 302, the one or more processors of the computing device may receive first electrical signals output from the receiver of the electromagnetic tracking system. The first electrical signals may indicate an intensity and orientation of an electromagnetic field sensed at the receiver coils of the receiver.

At block 304, the one or more processors of the computing device may receive second electrical signals from the non-magnetic tracking system. The second electrical signals may indicate a position and orientation of the tracked object without relying on the electromagnetic fields generated by the electromagnetic tracking system. For instance, in the case of a non-magnetic tracking system including an IMU, the second electrical signals may include outputs from one or more accelerometers included in the non-magnetic tracking system and attached to the tracked object.

At block 306, the one or more processors of the computing device may determine an uncalibrated first PnO of the tracked object based on the first electrical signals. Additionally, at block 308, the one or more processors of the computing device may calculate a corresponding quality factor of the uncalibrated first PnO. The quality factor may indicate a level of reliability of the electromagnetic system, a likelihood or amount of distortion present in the operating volume, or both. For instance, the quality factor may depend on an evaluation of a structure of the magnetic field around the receiver. The structure of the magnetic field may be evaluated based on the electrical signals received at the receiver, and the evaluation may indicate whether the evaluated structure is reflective of an expected structure of the magnetic field emitted by the transmitter. In such an instance, differences between the evaluated structure and the expected structure may indicate the presence of distortion in the operating volume that is affecting the received electrical signals.

At block 310, the one or more processors of the computing device may determine whether the calculated quality factor is equal to or greater than a threshold quality value. The threshold quality value may be a predetermined value indicating a minimum level of quality for reliable PnO generated by the electromagnetic tracking system. An uncalibrated first PnO that corresponds to a quality factor value at or above the threshold quality value may be trusted as an accurate PnO, and may be relied on as the actual position and orientation of the tracked object.

If the calculated quality factor is equal to or greater than a threshold quality value, then operations may continue at block 312, with the one or more processors determining the PnO of the tracked object to equal the first PnO. At this stage, it should be recognized that no calibration has been performed on the system. Nonetheless, the calculation of the quality factor and evaluation of the first PnO can be performed without prior calibration and instead based on the magnetic field structure represented by the electrical signals received by the receiver and how that magnetic field structure compares to a predetermined expected magnetic field structure.

Conversely, if the calculated quality factor is less than the threshold quality value, then this may indicate the presence of distortion in the magnetic field, and operations may continue with correction of the uncalibrated first PnO. First, at block 314, the one or more processors of the computing system may determine whether a correction factor corresponding to the uncalibrated first PnO is stored in a lookup table. The correction factor may indicate a correction to the uncalibrated first PnO to compensate for the presence of distortion. This value may be expressed, for example, as an actual PnO corresponding to the uncalibrated first PnO, or as a vector that may be summed with the uncalibrated first PnO to result in the actual PnO.

If the lookup table contains a correction factor corresponding to the uncalibrated first PnO, then operations may proceed to block 316 with the one or more processors of the computing device applying the correction factor to the uncalibrated first PnO. Application of the correction factor may effectively calibrate or correct the first PnO in order to arrive at an actual PnO of the tracked object. Operations may then continue at block 318 with the one or more processors of the computing device determining the PnO of the tracked object to equal the result of applying the correction factor to the first PnO.

Conversely, if the lookup table does not contain a correction factor corresponding to the uncalibrated first PnO, then operations may continue using the non-magnetic tracking system to approximate the PnO of the tracked object. The non-magnetic tracking system may be generally less reliable than a calibrated electromagnetic tracking system, but in the present instance in which the electromagnetic tracking system is not yet calibrated and the uncalibrated first PnO is suspected of being inaccurate due to distortion in the operating volume, the non-magnetic tracking system may be considered more reliable.

At block 320, the one or more processors of the computing device may determine a second PnO based on electrical signals received from the non-magnetic tracking system. The electrical signals may indicate a change in position, orientation or both of the tracked object over time. For instance, in the case of a non-magnetic tracking system including one or more accelerometers connected to the tracked object, the electrical signals may indicate changes in translational acceleration and rotational acceleration, which may be used to derive changes in translation and rotation of the tracked object.

At block 322, the one or more processors may determine the correction factor for the uncalibrated first PnO based on the second PnO. Since the second PnO is believed to be accurate and the distorting elements distorting the first PnO are known to not affect the second PnO, the second PnO can be assumed to represent an accurate PnO measurement of the tracked object. Therefore, at a next time that the electromagnetic tracking system derives the first PnO with the same detected distortion to the structure of the magnetic field, it may be assumed that the actual PnO of the tracked object is the second PnO. Thus, the correction factor of the first PnO may be, for example, the second PnO itself or a difference between the first PnO and the second PnO.

At block 324, the one or more processors may store the correction factor in the lookup table in storage of the computing device. Storage of the correction factor ensures that it is available for calibrating the first PnO at any future time that the electromagnetic tracking system derives the first PnO with the same detected distortion to the structure of the magnetic field.

As the tracked object moves about the operating volume of the electromagnetic tracking system, the routine 300 of FIG. 3 may be repeated. In operation, for each new position or orientation of the tracked object, a new first PnO may be derived and evaluated for quality. For first PnOs with a corresponding quality factor that is below the threshold, calibration using contents of the lookup table or using the second PnO derived from the non-magnetic tracking system, may be used instead. The lookup table may be a first resort, and the second PnO may be a second resort, whereby the derived second PnO may be stored in the lookup table for future instances. Over time, the tracked object may pass through a sufficient number of locations of the operating volume at a sufficient number of orientations, by which point the lookup table may be sufficiently filled with correction factors for any location within the operating volume for which magnetic field distortion is detected.

In the example routine 300 of FIG. 3, the non-magnetic tracking system is maintained in isolation from the electromagnetic tracking system, such that the measurements taken by the non-magnetic tracking system are fully independent from input from the electromagnetic tracking system. However, in other example routines, the non-magnetic tracking system can itself be calibrated using the electromagnetic tracking system. For instance, if the first PnO determined from the electromagnetic tracking system satisfies the threshold quality value, then further operations may be taken to calibrate the non-magnetic tracking system.

Figure 4:
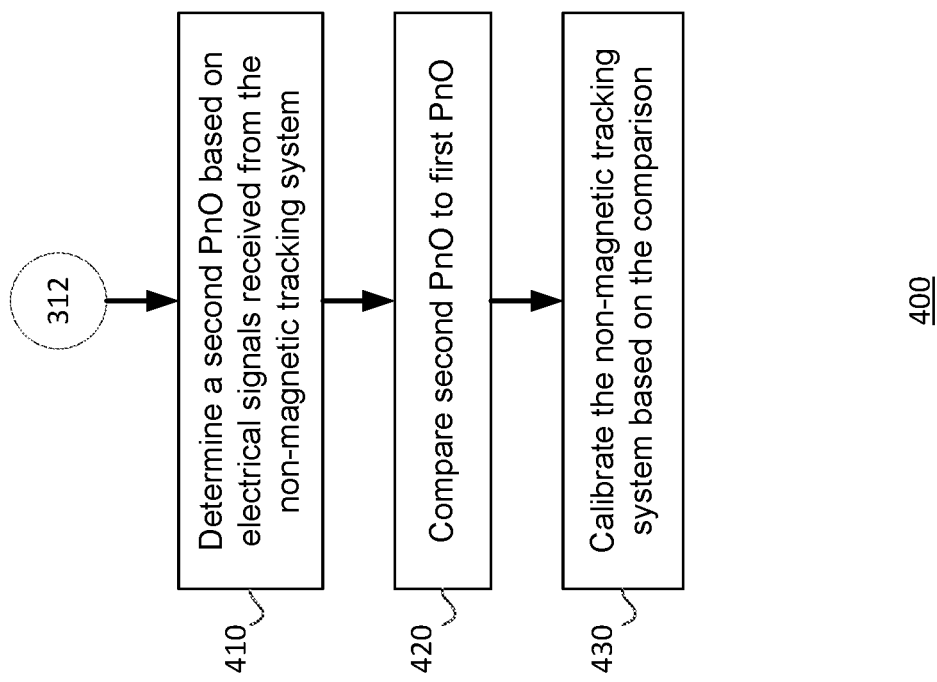
FIG. 4 is a flow diagram of an example modification to the example routine of FIG. 3.

FIG. 4 illustrates an example sub-routine 400 that may be incorporated into the example routine 300 of FIG. 3. In the example of FIG. 4, operations may begin after the operations of block 312 in FIG. 3, in which the PnO of the tracked object is determined to equal the first PnO. At block 410, the one or more processors of the computing device may determine a second PnO based on electrical signals received from the non-magnetic tracking system. The operations of block 410 may be the same or similar to operations described in connection with block 322 of FIG. 3.

At block 420, the first PnO may be compared to the second PnO. If the first PnO and second PnO are equal, operations may conclude. Conversely, if the first PnO is different from the second PnO, this may indicate that the second PnO is inaccurate, and operations may continue at block 430 with calibration of the non-magnetic tracking system. The calibration may involve adjusting one or more sensors of the non-magnetic tracking system until the sensors produce a second PnO that equals the first PnO. For example, in the case of an IMU, sensors included in the IMU are typically prone to drift over time. Therefore, when a PnO derived from the IMU does not equal the first PnO, the IMU sensors may be recalibrated by correcting for drift until a PnO derived from the IMU sensor measurements equals the first PnO. This may involve an accurate sensor azimuth measurement from the electromagnetic tracking system being combined with the measurements from the IMU to determine a true orientation of the IMU sensor and thereby, calculate the IMU drift correction. Similar techniques may be applied to other types of non-magnetic sensors, such as multiplying light sensor or noise sensor measurements by a factor to compensate for occlusion.

Although not shown in FIG. 4, it should be understood that the same or similar actions may be executed in response to assigning a calibrated PnO as the actual PnO of the tracked object. In other words, the operations of sub-routine 400 may be carried out after or alongside the operations of block 318 in FIG. 3. Since the calibrated PnO is typically as reliable as an uncalibrated PnO in a system without distortion, the calibrated PnO may be equally useful for calibrating the non-magnetic tracking system.

Also, in the example routine 300 of FIG. 3, non-magnetic based measurements are used whenever electromagnetic-based measurements have some threshold amount of distortion and no correction factor is available. However, in other example routines, additional factors may be considered to determine whether to rely on non-magnetic based measurements or electromagnetic-based measurements. For example, the non-magnetic tracking system may be evaluated to determine whether it is reliable. In some examples, determining reliability of the non-magnetic tracking system may be based on its own respective quality factor. The quality factor may assess a risk of the measurements from the non-magnetic tracking system being inaccurate. In some examples, the quality factor may be based on factors external to the signal data itself, such as an amount of time since a most recent calibration of the non-magnetic sensor, which may be useful for estimating a buildup of drift in an IMU sensor over time. In other examples, the quality factor may be based on the signal data itself. Each type of non-magnetic sensor data may be evaluated based on its own predefined standard. For instance, reliability of an accelerometer, gyroscope, magnetometer, optical sensor or acoustic sensor data may be based on a degree of noise present in the data. The noise may be evaluated according to an amount of shock or a maximum degree of rotation of the sensor, such as due to sudden changes in translation or rotation of the sensor. In some cases, a signal-to-noise threshold may be predefined and used to evaluate the data. Other known techniques for measuring sensor reliability may include occlusion indicators, noise measurements, and motion models.

In some examples, the quality factor of the non-magnetic tracking system may be compared to a predetermined threshold value. In such examples, the quality factor meeting or exceeding the threshold could result in the system relying on the second PnO from the non-magnetic tracking system, whereas the quality factor being less than the threshold could result in the system relying on the first PnO from the electromagnetic tracking system, even if the quality factor of the electromagnetic tracking system is below its own respective threshold. In other examples, the quality factors of the electromagnetic tracking system and the non-magnetic tracking system may be compared with one another, and the determined PnO associated with the system having a higher quality factor may be selected as the actual PnO of the tracked object.

In further examples, the quality factor of the non-magnetic tracking system may be stored and compared to itself during later measurements. For examples, if a coordinate is measured at a first time and no correction factor data appears in the lookup table, the routine may involve determining a correction factor based on the non-magnetic tracking system and storing the correction factor in the lookup table, regardless of how low the quality factor of the non-magnetic tracking system may be at that time. However, if the same coordinate is measured at a subsequent second time and the non-magnetic tracking system is known to have a better quality factor at the second time than the first time, then it may be preferable to recalculate the correct factor data and replace the currently stored correction factor with the recalculated correction factor in order to provide a more accurate calibration of the electromagnetic tracking system. In such examples, each coordinate stored in the lookup table may be stored with a corresponding quality factor value indicating a quality factor of the non-magnetic tracking system at a time of the correction factor calculation. Future measurements associated with the same coordinate may then compare the stored quality factor with a then-current quality factor of the non-magnetic tracking system in order to determine whether to recalculate the correction factor or rely on the stored correction factor.

Additionally or alternatively, if the same coordinate is measured at a subsequent second time and the non-magnetic tracking system is known to have a quality factor at the second time that is higher than a predetermined amount, then it may be preferable to recalculate the correct factor data and replace the currently stored correction factor with the recalculated correction factor regardless of whether a previously calculated correction factor was based on non-magnetic data having an even higher quality factor. This may be useful in scenarios for which the magnetic distortion in the operating volume can change over time. In such scenarios, even if the non-magnetic tracking system experiences a relative drop in quality over time, the most recent data may be a more accurate reflection of a current state of the magnetic distortion, and thus may be more reliable for correcting the electro-magnetic tracking system moving forward.

In yet further examples, it may be possible for both the first PnO and the second PnO to be combined. For instance, if both the electromagnetic and non-magnetic tracking systems are determined to be unreliable, then averaging the first and second PnO solutions may result in a better approximation of the actual PnO as compared to relying solely on one of the first or second PnO solutions. In instances where one of the electromagnetic and non-magnetic tracking systems has a higher quality factor than the other, it may further be possible to weight the first and PnO solutions to reflect the relative confidence in each solution based on the quality factors of the systems. Combining PnO solutions may be performed using one or more filtering techniques, such as those filtering techniques described in connection with co-owned U.S. Pat. No. 11,326,905, the disclosure of which is hereby incorporated in its entirety herein.

In the above example techniques, it is assumed that a particular PnO is contained in the lookup table of the memory only if the exact PnO appears there. However, it should be understood and appreciated that calibration techniques typically do not require an exhaustive survey of every possible position at every possible orientation. Rather, calibration techniques generally acquire a sufficient amount of positions and orientations from which all positions and orientations can be extrapolated, interpolated, or otherwise approximated. Accordingly, a PnO corresponding to electrical signals from the electromagnetic tracking system may be considered to correspond to a PnO stored in the lookup table based on conventional lookup extrapolation, interpolation or approximation routines.

The above examples generally describe a technique in which a quality factor of the electromagnetic tracking system is evaluated independently of the data received from the non-magnetic tracking system. However, in other examples, non-magnetic tracking system data may be used to evaluate the quality factor of the electromagnetic tracking system. For instance, in the case of a non-magnetic tracking system including an IMU, the quality factor may depend on data from the IMU. Although some IMU data may be unreliable for quality factor evaluation due to susceptibility to drift, such as an estimated azimuth of the tracked object, estimated elevation and roll is not as susceptible to drift. Therefore, elevation and roll information received from the IMU can be compared to the elevation and roll information derived from the uncalibrated first PnO, and if the elevation and roll information of the two systems do not match with one another, it may be determined that the electromagnetic tracking system has a low quality factor. The degree of difference between the respective elevation and roll information derived from the two systems may further indicate a magnitude of the quality factor of the electromagnetic tracking system. In such an implementation, it may be necessary to evaluate the second electrical signals from the non-magnetic tracking system before determining the quality factor of the electromagnetic tracking system.

The above examples generally describe systems and methods in which a receiver circuit is mounted to the tracked object and moving about the tracking region, while a plurality of transmitter circuits are positioned in fixed locations to track the one receiver circuit. However, due to the reciprocal nature of electromagnetic tracking systems, an alternative configuration may involve providing a plurality of receiver circuits in fixed locations, and affixing a transmitter circuit to the tracked object. Such an arrangement will still result in having two transmitter-receiver pairs, and this will result in independent construction of two matrices corresponding to the respective transmitter-receiver pairs.

Utilizing a single transmitter circuit in place of a single receiver circuit can simplify some aspects of the system. First of all, with a single transmitter circuit at a single location, it is no longer necessary to time-division or frequency-division multiplex multiple transmitter circuits with one another. A single magnetic field may be generated by the transmitter circuit, and then separately detected by the multiple receiver circuits positioned about the tracking region. As long as the one or more processors is capable of distinguishing between the electrical signals received from each receiver circuit (e.g., using an identification, such as header data, in the received electrical signals), then the matrices associated with the respective receiver circuits may be constructed, analyzed and weighted independently of one another.

The above examples also generally describe an electromagnetic tracking system including one transmitter and one receiver. However, it should be appreciated that the same or similar principles may be applied to electromagnetic tracking systems having either multiple transmitters or multiple receivers. In such systems, it may be possible for a magnetic field between the tracked object and one of the transmitters or receivers to be distorted while another magnetic field between the tracked object and a different transmitter or receiver is not distorted. In such an instance, it may be possible for the one or more processors to determine which of the transmitter-receiver pair connections is subject to distortion and to collect PnO data using the other transmitter-receiver pair. Such data may then be used to populate a lookup table entry for the distorted transmitter-receiver pair's signal, to calibrate the non-magnetic tracking system, or both.

Furthermore, the above examples generally describe a system for tracking the PnO of a receiver circuit. However, it should be understood that the receiver circuit may be mounted or otherwise affixed to another object, and that the PnO of the other object may be tracked based on the electrical signals from the receiver circuit. Such objects may include but are not limited to a wearable or handheld object operated by a user, such as a helmet, a handheld surgical device, or a stylus. More generally, the methods and systems of the present disclosure may be applicable to, but are not limited to tracking the PnO of head mounted displays (HMD), handheld or wearable devices for surgical navigation (including simulations of surgical procedures), and handheld or wearable devices virtual reality or augmented reality programs.

For applications in which the user is not traveling, the plurality of transmitter circuits may be mounted or otherwise affixed to one or more fixed platforms, such as tripods or surfaces located in or about the tracking region. For applications in which the user is traveling, such as in a vehicle, the plurality of transmitter circuits may be mounted to a frame of the vehicle. In any of the above described instances, the transmitter circuits may be calibrated to permit for the transmitter circuits to align with a fixed frame of reference against which the PnO of the tracked object is evaluated.

The above examples generally describe a receiver circuit that includes an array of coils in order to detect the magnetic field generated by the transmitter circuit or circuits. However, in other examples, the receiver circuit may include sensing elements other than coils. For example, the receiver circuit may include one or more Hall effect sensing elements. It should be understood that the receiver coils of any of the above examples and embodiments may be replaced with the alternative receiver elements without changing the underlying nature of the systems and methods.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. An apparatus comprising:
   memory for storing a plurality of coordinate positions and orientations (PnOs) with an operating volume and a respective correction factor for each stored coordinate PnO; and
   one or more processors configured to:
      receive first electric signals from a receiver circuit including a plurality of receiver elements aligned at different receiver axes, each receiver element configured to detect a magnetic field along its respective axis, wherein the first electrical signals are indicative of a first PnO estimate of a first object according to a frame of reference defined by a second object;
      receive second electric signals from a non-magnetic tracking device, wherein the second electric signals are indicative of second PnO estimate of the first object;
      determine a quality factor of the first electric signals;
      in response to the quality factor being at or above a threshold value, assign the first PnO estimate as an actual PnO of the first object;
      in response to the quality factor being below the threshold value:
         determine whether a first coordinate PnO corresponding to the first PnO estimate is stored in the memory;
         in response to the first coordinate PnO being stored in the memory:
            adjust the first PnO estimate according to the correction factor corresponding to the first coordinate PnO; and
            assign the adjusted first PnO estimate as the actual PnO of the first object;
         in response to the first coordinate PnO not being stored in the memory:
            store the first coordinate PnO in the memory;
            calculate the corresponding correction factor of the first coordinate PnO based on the second PnO estimate; and
            store the corresponding correction factor in the memory with the first coordinate PnO.

2. The apparatus of claim 1, wherein the one or more processors are further configured to assign the second PnO estimate as the actual PnO of the first object.

3. The apparatus of claim 1, wherein the one or more processors are further configured to, in response to the quality factor being at or above a threshold value, calibrate the non-magnetic tracking device based on the first PnO estimate.

4. The apparatus of claim 3, wherein the one or more processors are further configured to calibrate one or more sensors of the non-magnetic tracking device based on the first PnO estimate by adjusting the one or more sensors of the non-magnetic tracking device until the second PnO estimate equals the first PnO estimate.

5. The apparatus of claim 4, wherein the non-magnetic tracking device is an inertial measurement unit (IMU), and wherein calibrating one or more sensors of the non-magnetic tracking device comprises correcting a drift of the IMU.

6. The apparatus of claim 4, wherein the one or more processors are further configured to:
   determine a second quality factor of the non-magnetic tracking device;
   in response to the second quality factor being at or above a second threshold value, assign the second PnO estimate as the actual PnO of the first object; and
   in response to the second quality factor being below the second threshold value, assign the first PnO estimate as the actual PnO of the first object.

7. The apparatus of claim 6, wherein the second quality factor is based on an amount of time since a most recent calibration of the one or more sensors of the non-magnetic tracking device.

8. The apparatus of claim 6, wherein the second quality factor is based on a ratio between the second electric signals and a degree of noise present in the second electric signals.

9. The apparatus of claim 4, wherein the one or more processors are further configured to:
   determine a second quality factor of the non-magnetic tracking device based on the second electric signals;
   in response to the second quality factor being at or above a second threshold value, update the correction factor corresponding to the first coordinate PnO based on the second PnO estimate.

10. The apparatus of claim 1, wherein the correction factor of the first coordinate PnO corresponds to a difference between the first PnO estimate and the second PnO estimate.

11. The apparatus of claim 1, wherein the one or more processors are further configured to:
    determine a magnetic field structure around the receiver circuit based on the first electric signals;
    compare the determined magnetic field structure to a predicted structure of the magnetic field, wherein the quality factor is based on the comparison.

12. The apparatus of claim 11, wherein the non-magnetic tracking device includes a first component freely moving with the first object, and a second component having a known position relative to the second object.

13. The apparatus of claim 11, wherein at least one element of the non-magnetic tracking device is mechanically coupled to either the receiver circuit or the transmitter circuit.

14. The apparatus of claim 11, wherein the non-magnetic tracking device includes at least one of a gyroscope, accelerometer, barometer, optical sensor, acoustic sensor, radio frequency sensor, global positioning system receiver, radar chip, or magnetometer.

15. The apparatus of claim 1, wherein the one or more processors are further configured to:
    derive a first elevation and roll of the tracked object based on the first electrical signals;
    derive a second elevation and roll of the tracked object based on the second electrical signals; and
    determine a difference between the first elevation and roll of the tracked object and the second elevation and roll of the tracked object, wherein the quality factor is based on the determined difference.

16. The apparatus of claim 1, further comprising:
    the non-magnetic tracking device;
    the receiver circuit; and
    a transmitter circuit including a plurality of transmission elements aligned at different transmitter axes, each transmission coil configured to emit a magnetic field along its respective axis, wherein the plurality of receiver elements are operative to detect magnetic fields emitted by the transmission coils along their respective axes and generate corresponding magnetic PnO data signals for each component of the detected magnetic field.

17. A method comprising:
    (a) receiving, by one or more processors, first electric signals from a receiver circuit including a plurality of receiver elements aligned at different receiver axes, each receiver element configured to detect a magnetic field along its respective axis, wherein the first electrical signals are indicative of a first position and orientation (PnO) estimate of a first object at a first time according to a frame of reference defined by a second object, wherein the first PnO estimate corresponds to a first coordinate PnO within an operating volume of the receiver circuit;
    (b) receiving, by the one or more processors, second electric signals from a non-magnetic tracking device, wherein the second electric signals are indicative of a second PnO estimate of the first object at the first time;
    (c) determining, by the one or more processors, a quality factor of the first electric signals;
    (d) in response to the quality factor being below a threshold value, determining, by the one or more processors, whether the first coordinate PnO is stored in memory;
    (e) in response to the first coordinate PnO not being stored in the memory, storing the first coordinate PnO and a corresponding correction factor based on the second PnO estimate in the memory;
    (f) receiving, by one or more processors, first electric signals from the receiver indicative of the first PnO estimate of the first object corresponding to the first coordinate PnO at a second time after the first time;
    (g) determining, by the one or more processors, the quality factor of the first electric signals indicative of the first PnO estimate at the second time;
    (h) in response to the quality factor being below the threshold value, adjusting, by the one or more processors, the first PnO according to the correction factor corresponding to the first coordinate PnO; and
    (i) assigning, by the one or more processors, the adjusted first PnO estimate as the actual PnO of the first object.

18. The method of claim 17, further comprising:
    receiving, by one or more processors, first electric signals from the receiver indicative of the first PnO estimate of the first object at a third time;
    determining, by the one or more processors, that the quality factor of the first electric signals indicative of the first PnO estimate at the third time is at or above the threshold value; and
    assigning, by the one or more processors, the first PnO estimate at the third time as the actual PnO of the first object without adjustment.

19. The method of claim 18, further comprising:
receiving, by the one or more processors, second electric signals from the non-magnetic tracking device indicative of the second PnO estimate of the first object at the third time; and
calibrating, by the one or more processors, the non-magnetic tracking device based on the first PnO estimate at the third time.

20. The method of claim 19, wherein calibration of the non-magnetic tracking device comprises adjusting one or more sensors of the non-magnetic tracking device until the second PnO estimate at the third time equals the first PnO estimate at the third time.

21. The method of claim 17, further comprising:
receiving, by one or more processors, first electric signals from the receiver indicative of the first PnO estimate of the first object at a fourth time;
receiving, by the one or more processors, second electric signals from the non-magnetic tracking device indicative of the second PnO estimate of the first object at the fourth time;
determining, by the one or more processors, the quality factor of the first electric signals at the fourth time;
in response to the quality factor of the first electric signals at the fourth time being below the threshold value and no coordinate PnO corresponding to the first PnO estimate of the first object at the fourth time being stored in the memory:
determining, by the one or more processors, a second quality factor of the non-magnetic tracking device based on the second electric signals at the fourth time; and
in response to the second quality factor being below the second threshold value, assigning, by the one or more processors, the first PnO estimate as the actual PnO of the first object.

22. The method of claim 21, wherein the second quality factor is based on an amount of time since a most recent calibration of the non-magnetic tracking device.

23. The method of claim 21, wherein the second quality factor is based on a ratio between the second electric signals at the fourth time and a degree of noise present in the second electric signals at the fourth time.

* * * * *